Sept. 5, 1967  H. L. MacDONELL  3,340,171
METHOD FOR ELECTROPHORETIC SEPARATION
OF MATERIALS IN A LOCALIZED AREA
Filed Feb. 14, 1963
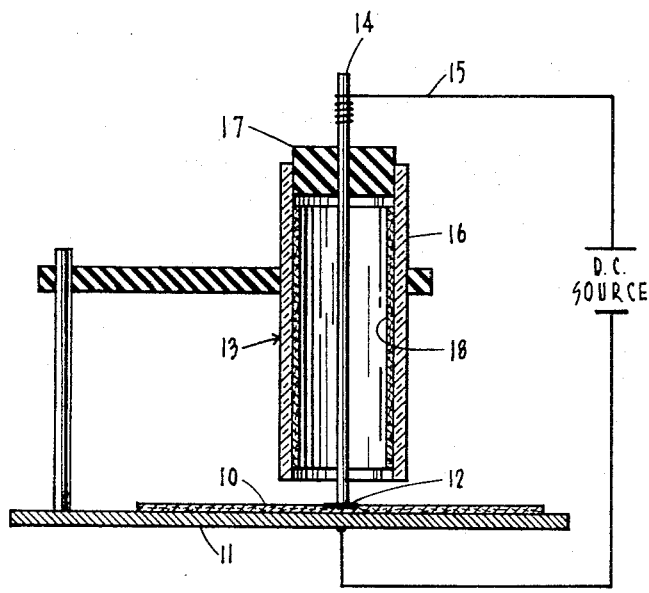
HERBERT L. MacDONELL   INVENTOR.
BY *Clarence R. Patty, Jr.*
ATTORNEY 3,340,171
METHOD FOR ELECTROPHORETIC SEPARATION OF MATERIALS IN A LOCALIZED AREA
Herbert L. MacDonell, Corning, N.Y., assignor to Corning Glass Works, Corning, N.Y., a corporation of New York
Filed Feb. 14, 1963, Ser. No. 258,456
11 Claims. (Cl. 204—180)

This invention relates to means and methods for effecting electrophoretic separations of soluble materials at precisely located points in such materials.

In order to effect electrophoretic separation of a solid material, it is necessary to form a solution of at least a part of the material. When large quantities of the material to be separated are available, it is not difficult to provide such a solution; however, when only small quantities are available, or when it is necessary to effect separation without substantial disturbance of the bulk of the material, conventional methods are generally unsatisfactory. For example, in the analysis of inks on written documents, large quantities of ink are not available, and it is difficult to remove enough of the dried ink to form a solution.

Accordingly, it is an object of the present invention to provide means and methods for effecting electrophoretic separation of small quantities of materials, particularly small quantities of soluble solid materials.

A further object is the provision of such means and methods which may be utilized to provide analysis of a material in situ at a precise localized area of the material.

These and other objects, which will be apparent from the description, are accomplished by the provision of a thin rod of a porous material which is impregnated with a liquid in which the material to be analyzed is soluble, in combination with means for applying an electrical potential across the material and the porous rod as one end of the rod is brought into contact with the material.

The invention will be described with reference to the accompanying drawing which is a sectional view of a device which may be used for analyzing ink on a document.

Referring to the drawing, document 10 is placed on silver plate 11, and ink line 12 is analyzed by means of electrophoresis probe 13, which comprises porous rod 14, which has been impregnated with a solvent, such as pH 8.6 Veronal. A small amount of the solvent has previously been placed on ink line 12, and when the porous rod has been brought into contact with the ink line, an electrical potential of, for example, 160 volts, is applied for approximately 10 minutes by means of silver wire 15, attached to the end of rod 14. A small amount of the ink goes into solution and is electrophoretically drawn up through porous rod 14. The ink particles in solution, having varying charges and masses, are drawn along the rod for varying distances, and the result is a pattern of color which varies along the length of the rod and is characteristic for various inks.

A particularly effective material for the construction of porous rod 14 is a glass body having an intricate network of minute intercommunicating voids and channels running therethrough. Such glass bodies are well known and are disclosed in U.S. Patent 2,106,744, issued to H. P. Hood and M. E. Nordberg. Such glass, which will hereinafter be referred to as "porous glass," has properties which render it particularly suitable for use in an electrophoresis probe. Among such properties are its inertness, its small pore diameter, which varies between 20 and 100 angstrom units with an average of approximately 40, its extremely high surface area, which varies between about 150–200 m.$^2$ per gm., and its high percentage of void space, which comprises about 28% of its volume.

In order to inhibit the evaporation of the electrolyte from rod 14, the rod is supported, as illustrated in the drawing, in glass cylinder 16 by means of rubber stopper 17. Filter paper 18, impregnated with the electrolyte, is placed inside the cylinder to supply moisture to the atmosphere surrounding the rod and thereby inhibit evaporation of the electrolyte from the rod. Alternatively, evaporation of the electrolyte may be prevented by means of a transparent coating of glass or plastic deposited directly on rod 14.

Porous rod 14, although preferably formed as a single fiber of porous glass having a diameter of from 0.010–0.100 inch, may be replaced by other porous materials, for example, by a cylinder of similar inner diameter filled with silica gel. The dimensions of the porous rod may vary, depending upon the degree of precision with which it is desired to determine the location of the sample to be taken. If the porous rod contains sufficient solvent or if the sample to be analyzed is liquid, it will be apparent that the step of supplying solvent to the sample may be eliminated.

It will be understood that, although preferable, it is not necessary for the porous body utilized in the present invention to be in the form of a cylindrical rod. The advantages of the invention accrue from the fact that the probe contacts the substance under analysis in situ and over a very small area, and, consequently, provides an analysis at a precise location, rather than averaging out variations within the material from one point to another. This localized testing can be effected by means of porous bodies of varying shape, as long as the body is provided with a point having a small area for contacting the sample. It is the discovery that such a pointed probe may be utilized merely by causing it to contact a substance to be separated which forms the basis of the present invention.

As used herein, the term "porous glass" includes all porous compositions within the scope of the above-mentioned United States Patent 2,106,744.

It will be understood that the foregoing has been provided only as a description of a preferred embodiment of the invention. Accordingly, the invention is not to be limited thereby, but is to be limited only by the scope of the appended claims.

What is claimed is:

1. The method of effecting electrophoretic separation of a localized portion of a substance containing electrophoretically mobile particles, which comprises the steps of providing a probe formed of a porous material which has suspended therein a liquid in which said substance is soluble, contacting said localized portion with said probe, and applying an electrical potential across said localized portion and said probe in order to distribute said electrophoretically mobile particles along at least part of the length of said probe in a direction generally parallel to the electrical field.

2. The method according to claim 1 in which said probe comprises porous glass having a continuous system of intercommunicating void spaces having diameters varying within the range approximately 20–100 angstrom units.

3. The method of effecting electrophoretic separation of ink on paper which comprises the steps of supporting said paper on an electrically conducting surface, applying to the portion of said ink to be separated a liquid in which said ink is soluble, providing a probe formed of a porous material which has suspended therein a liquid in which said ink is soluble, contacting said ink with said probe, and applying an electrical potential between said electrically conducting surface and a part of said probe remote from said ink to distribute the particles of said ink along at least part of the length of said probe.

4. The method according to claim 3 in which said porous material comprises porous glass having a continuous system of intercommunicating void spaces having diameters within the range approximately 20–100 angstrom units.

5. The method according to claim 3 in which said probe comprises a porous glass fiber.

6. The method of effecting electrophoretic separation of a portion of a substance containing electrophoretically mobile particles which comprises the steps of providing an elongated probe formed of a porous material having suspended therein a liquid in which said portion is soluble, contacting said portion of said substance with an end of said elongated probe, and applying a direct current electric field across said portion of said substance and said probe in a direction generally parallel to the length of said probe in order to separate charged particles in said portion and to distribute said particles along at least a part of the length of said probe in accordance with the mobilities thereof.

7. The method according to claim 6 in which said probe comprises a transperent material.

8. The method according to claim 6 in which said probe comprises porous glass having a continuous system of intercommunicating void spaces having diameters varying within the range approximately 20–100 angstrom units.

9. The method of effecting electrophoretic separation of ink on paper which comprises the steps of supporting said paper on an electrically conducting surface, applying to a portion of said ink to be separated a liquid in which said ink is soluble, contacting said portion of said ink with an elongated probe formed of a porous material having suspended therein a liquid in which said ink is soluble, and applying an electric field between said electrically conducting surface and a part of said probe remote from said portion of said ink and in a direction generally parallel to the length of said probe in order to cause charged particles in said ink to migrate by varying distance from said paper along said probe.

10. The method according to claim 9 in which said probe comprises a transparent material.

11. The method according to claim 9 in which said porous material comprises porous glass having a continuous system of intercommunicating void spaces having diameters within the range approximately 20–100 angstrom units.

References Cited
UNITED STATES PATENTS

| | | | |
|---|---|---|---|
| 1,319,192 | 10/1919 | Von Madaler et al. | 204—224 |
| 1,844,928 | 2/1932 | Slepian | 204—224 |
| 2,463,711 | 3/1949 | Nagle | 204—224 |
| 2,723,756 | 11/1955 | Miller et al. | 210—31 |
| 3,145,156 | 8/1964 | Oster | 204—299 |

OTHER REFERENCES

MacDonell: Analytical Chemistry, pages 1552–1555, vol. 33, No. 11, October 1961.

JOHN H. MACK, *Primary Examiner.*

JOHN R. SPECK, HOWARD S. WILLIAMS,
*Examiners.*

G. BATTIST, E. ZAGARELLA, *Assistant Examiners.*